United States Patent
Otsuka

(10) Patent No.: US 6,324,198 B1
(45) Date of Patent: Nov. 27, 2001

(54) APPARATUS AND METHOD FOR COMPENSATING FOR TEMPERATURE OF LASER DIODE

(75) Inventor: Tatsuhiro Otsuka, Suwon (KR)

(73) Assignee: Samsung Electronics Co., Ltd., Suwon (KR)

(*) Notice: Subject to any disclaimer, the term of this patent is extended or adjusted under 35 U.S.C. 154(b) by 0 days.

(21) Appl. No.: 09/099,066

(22) Filed: Jun. 16, 1998

(30) Foreign Application Priority Data

Dec. 12, 1997 (KR) .................................................. 97-68345

(51) Int. Cl.[7] ...................................................... H01S 3/00
(52) U.S. Cl. .......................................... 372/38.07; 372/33
(58) Field of Search ............................... 372/33, 31, 38.1, 372/38.09, 38.07; 359/310; 250/205

(56) References Cited

U.S. PATENT DOCUMENTS

| | | | |
|---|---|---|---|
| 4,367,926 | * 1/1983 | Hohki | 359/310 |
| 4,663,760 | * 5/1987 | Shimada et al. | 372/31 |
| 4,813,046 | 3/1989 | Shimada | 372/38 |
| 4,856,008 | 8/1989 | Senma et al. | 372/31 |
| 5,105,077 | * 4/1992 | Asada | 250/205 |
| 5,274,653 | * 12/1993 | Ohashi | 372/31 |

FOREIGN PATENT DOCUMENTS

| | | |
|---|---|---|
| 0 061 034 | 9/1982 | (EP) . |
| 63-82020 | 4/1988 | (JP) . |
| 1-304369 | 12/1989 | (JP) . |
| 5-13852 | 1/1993 | (JP) . |

OTHER PUBLICATIONS

Patent Abstracts of Japan, vol. 097, No. 009, Sep. 30, 1997 & JP 09 139535, May 27, 1997 * abstract *.

* cited by examiner

*Primary Examiner*—Quyen Leung
(74) *Attorney, Agent, or Firm*—Staas & Halsey LLP

(57) ABSTRACT

A temperature compensation apparatus for controlling an output power of a laser diode according to a temperature variation of the laser diode, and a method therefor. An error voltage between a voltage corresponding to the output power of the laser diode and a reference voltage is generated. The error voltage is output as a control voltage corrected based on the output power and is applied to the laser diode. When the level of the error voltage overflows or underflows in a first up/down counter, the control voltage based on the luminous efficiency of the laser diode is output by applying the corrected control voltage to the laser diode while interlocking the first up/down counter with a second up/down counter. Accordingly, it is possible to stabilize the luminous efficiency and reduce control error of the laser diode.

8 Claims, 3 Drawing Sheets

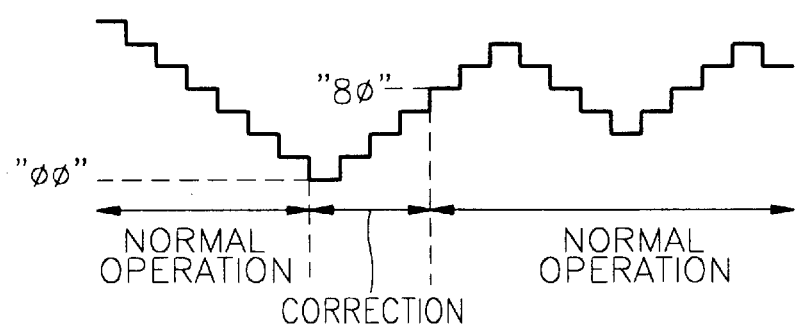
FIG. 3A
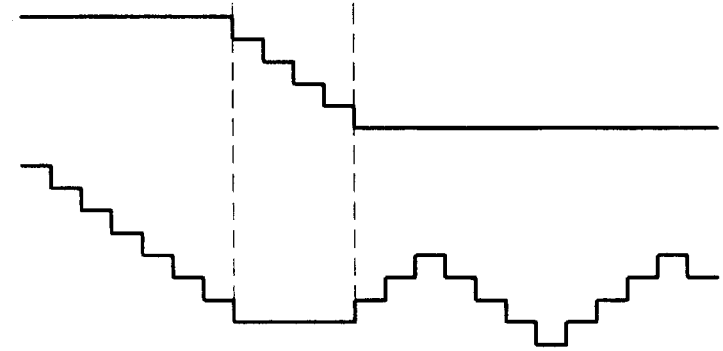
FIG. 3B
FIG. 3C
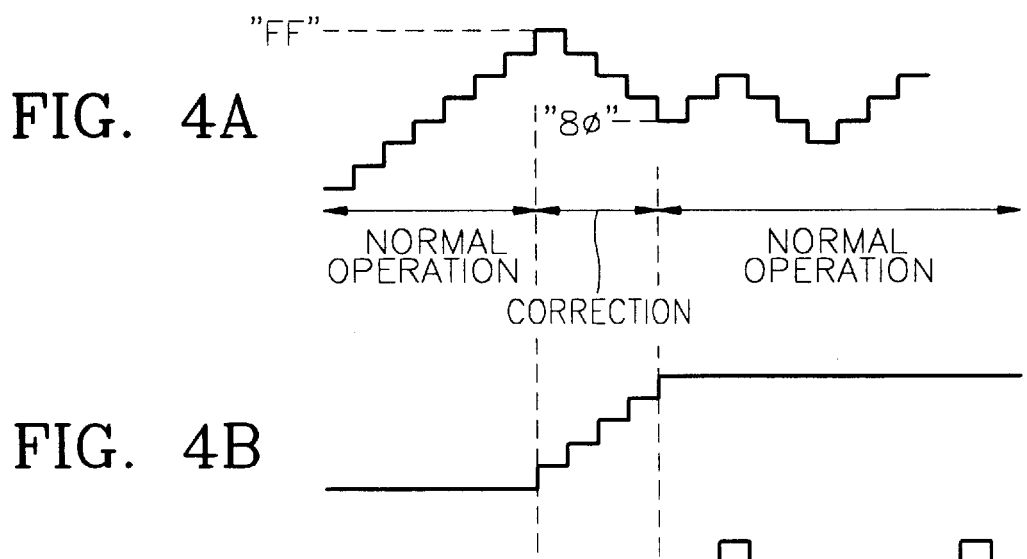
FIG. 4A
FIG. 4B
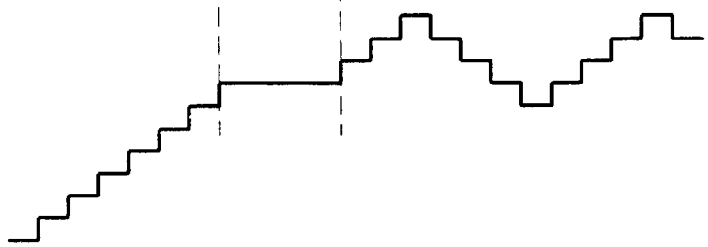
FIG. 4C

APPARATUS AND METHOD FOR COMPENSATING FOR TEMPERATURE OF LASER DIODE

CROSS-REFERENCE TO RELATED APPLICATIONS

This application claims the benefit of Korean Application No. 68345/97, filed Dec. 12, 1997, in the Korean Patent Office, the disclosure of which is incorporated herein by reference.

BACKGROUND OF THE INVENTION

1. Field of the Invention

The present invention relates to an apparatus and a method for compensating for the temperature of a laser diode in an optical disk field, and more particularly, to an apparatus and a method for compensating for the temperature of a laser diode in which output power changes according to the variation of the temperature.

2. Description of the Related Art

It is possible to read information from a disk without error only when light is stably emitted from a laser diode. This is achieved by controlling a luminous efficiency which changes according to the variation of the temperature of a narrow-wavelength laser diode in an optical disk field. Accordingly, it is possible to heighten the reliability of an optical recording and reproduction system.

FIG. 1 is a block diagram showing a conventional temperature compensation apparatus of a laser diode. In FIG. 1, the output of a laser diode 11 is converted into a voltage signal by a photodiode 12. An amplifier 13 amplifies a very low voltage output from the photodiode 12 to a signal level. A voltage comparator 14 compares the voltage amplified by the amplifier 13 with a reference voltage, and generates an error signal. Here, the reference voltage is generated by a reference voltage generator 15 and is previously set.

An up/down counter 16 up-counts ("increments") and down-counts ("decrements") based upon the comparison of the error signals and generates an error voltage by correcting the error signal. A digital-to-analog converter 17 converts the corrected error voltage into an analog voltage signal. A current amplifier 18 converts the analog voltage signal into a current signal for driving the laser diode 11 and applies the current signal to the laser diode 11. The output power of the laser diode 11 is controlled by continuously performing such an operation.

However, it is hard to control the variation of the optical output of the laser diode due to temperature by using only the up/down counter 16, since the variation of the temperature is severe in the narrow-wavelength laser diode. Therefore, it is impossible to compensate for the variation of the optical output by the conventional apparatus shown in FIG. 1.

SUMMARY OF THE INVENTION

To solve the above problem, it is an object of the present invention to provide a temperature compensation apparatus of a laser diode in which it is possible to reduce a control error by extending the range of the control voltage of the laser diode, considering deterioration due to the variation of the temperature of the laser diode.

It is another object of the present invention to provide a temperature compensation method of a laser diode, for stabilizing a luminous efficiency by extending the range of the control voltage of the laser diode, considering the deterioration due to the variation of the temperature of the laser diode.

Additional objects and advantages of the invention will be set forth in part in the description which follows and, in part, will be obvious from the description, or may be learned by practice of the invention.

Accordingly, to achieve the first and other objects of the present invention, there is provided a temperature compensation apparatus of a laser diode, for controlling the output power of a laser diode according to the variation of a temperature of the laser diode, including a first generator to generate an error voltage between a voltage corresponding to the output power of the laser diode and a reference voltage and a second generator to generate a corrected control voltage by receiving the error voltage, based on the output power and to output the corrected control voltage to the laser diode for a predetermined period of time when the error voltage overflows or underflows.

To achieve the second and other objects of the present invention, there is provided a temperature compensation method of a laser diode, for controlling the output power of a laser diode according to a temperature change of the laser diode, including the steps of (a) generating an error voltage between a voltage corresponding to the output power of the laser diode and a reference voltage and (b) generating a control voltage by correcting the error voltage based on the output power and extending the range of a control voltage by outputting a corrected control voltage to the laser diode for a predetermined period of time when the level of the error voltage overflows or underflows.

BRIEF DESCRIPTION OF THE DRAWINGS

The above objectives and advantages of the present invention will become more apparent by describing in detail a preferred embodiment thereof with reference to the attached drawings, in which:

FIGS. 3A to 3C describe an operation of the apparatus shown in FIG. 2 when a luminous efficiency of the laser diode rises; and FIGS. 4A to 4C describe an operation of the apparatus shown in FIG. 2 when the luminous efficiency of the laser diode falls.

DESCRIPTION OF THE PREFERRED EMBODIMENT(S)

Reference will now made in detail to the present preferred embodiments of the present invention, examples of which are illustrated in the accompanying drawings. The embodiments are described below in order to explain the present invention by referring to the figures.

Figure 1:
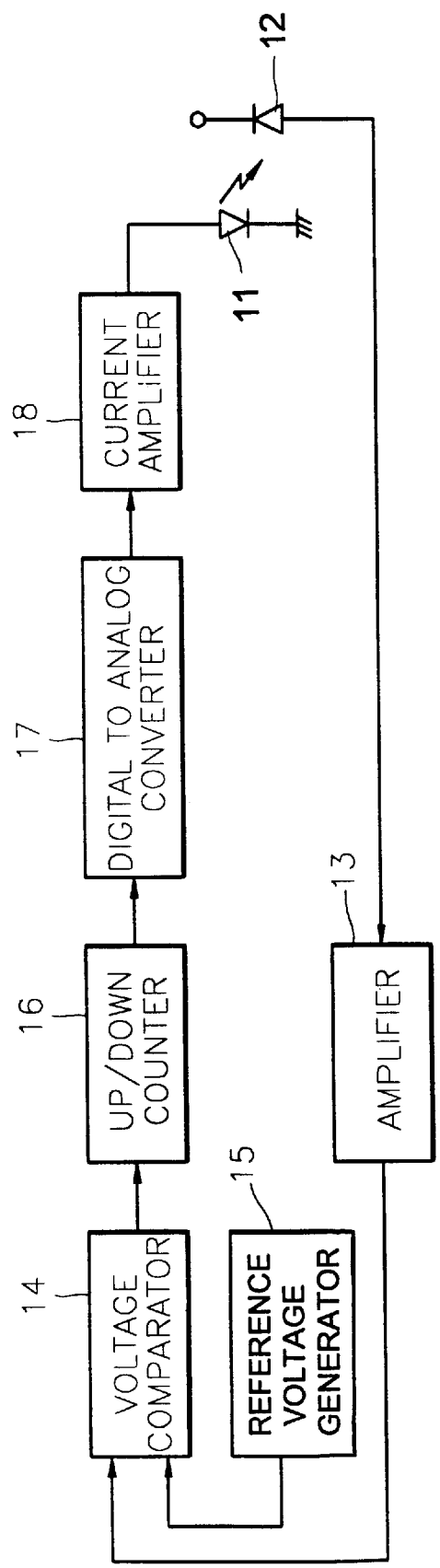
FIG. 1 is a block diagram of a conventional temperature compensation apparatus of a laser diode.
Figure 2:
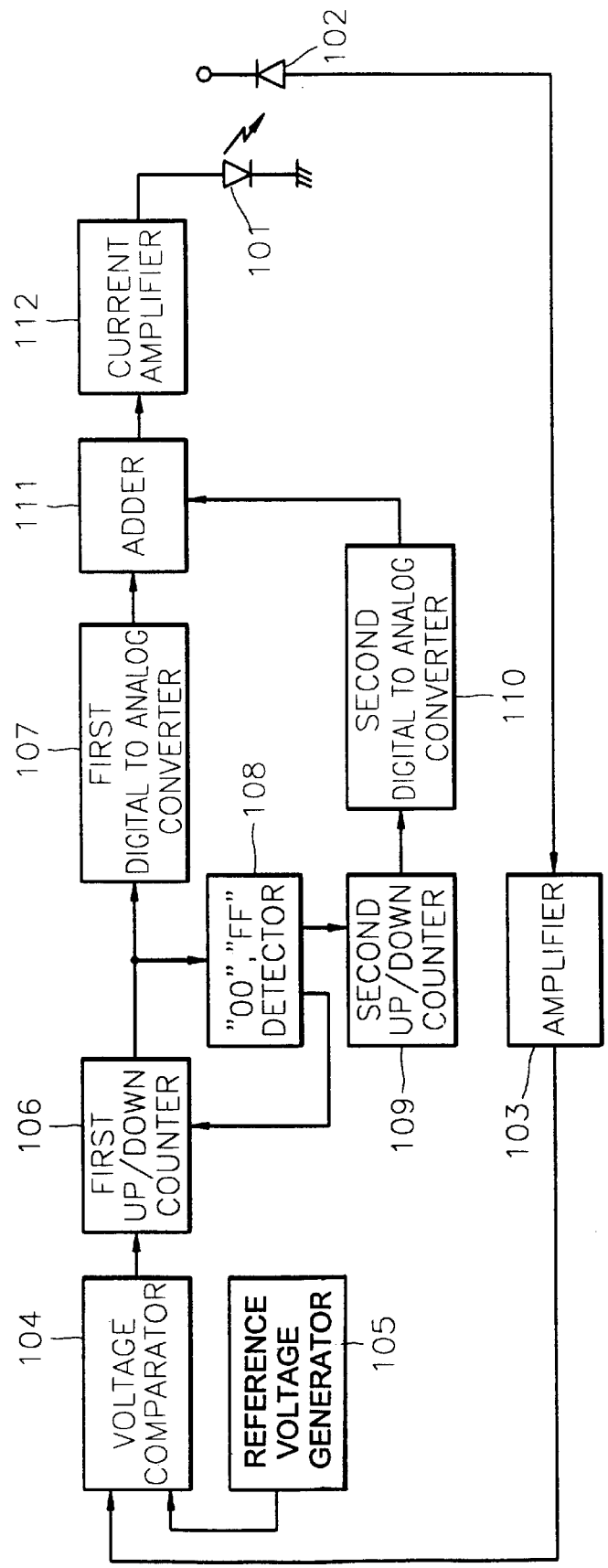
FIG. 2 is a block diagram of a temperature compensation apparatus of a laser diode, according to an embodiment of the present invention.

FIG. 2, is a block diagram of a temperature compensation apparatus according to an embodiment of the present invention, in which two up/down counters 106 and 109 and two digital-to-analog (D/A) converters 107 and 110 are used, while one up/down counter and one digital-to-analog converter are used in the conventional technology. Other new elements include an adder 111 for adding the output of the first digital-to-analog converter 107 to that of the second-to-analog converter 110, and an underflow and overflow ("00" and "FF") detector (referred to as a "detector" 108, hereinafter) for detecting when the first up/down counter 106 underflows or overflows.

The operation of the apparatus shown in FIG. 2 will now be described.

When a laser diode 101 emits light, a very low voltage corresponding to a received light signal received from the laser diode 101 by a photodiode 102 is amplified to a signal level by an amplifier 103. A voltage comparator 104 compares the output voltage of the amplifier 103 with a reference voltage 105 and applies an error signal to the first up/down counter 106. The first up/down counter 106 upcounts ("increments") and down-counts ("decrements") based upon the comparison of the error signal and applies a corrected error voltage to the first digital-to-analog converter 107 and the detector 108.

During normal operation in which the first up/down counter 106 does not underflow or overflow, the second up/down counter 109 applies a predetermined uniform value (an initial value is "80") to the adder 111 through the second digital-to-analog converter 110. The uniform value is renewed ("updated") when the underflow or overflow is generated.

The adder 111 adds the corrected error voltage, supplied from the first up/down counter 106 through the first digital-to-analog converter 107, to the voltage corresponding to the uniform value supplied from the second up/down counter 109 through the second digital-to-analog converter 110. A current amplifier 112 applies a drive current corresponding to the sum voltage from the adder 111 to the laser diode 101, to control the output power of the laser diode 101.

Meanwhile, when the first up/down counter 106 underflows ("00") or overflows ("FF") due to a temperature variation of the laser diode 101, the detector 108 generates a flag and applies it to the first and second up/down counters 106 and 109. At this time, the second up/down counter 109 is enabled according to the flag supplied from the detector 108. The first up/down counter 106 begins a count operation for performing a correction mode different from a normal mode, according to the flag supplied from the detector 108. The flag can be referred to as a detection signal.

Additionally, in the conventional technology, when the up/down counter underflows or overflows due to the temperature variation of the laser diode, the up/down counter stops operating and turns off the system.

When an underflow occurs, in which the count value (referred to as "first count value", hereinafter) of the first up/down counter 106 becomes "00," the first up/down counter 106 counts up to a predetermined offset value (here, "80"). At the same time, the second up/down counter 109 begins down counting from a predetermined value (an initial value is "80"), continuously performs down counting until the first count value becomes the offset value ("80"). Once the first count value becomes the offset value ("80"), the second up/down counter 109 maintains its count value until the underflow or overflow occurs again.

Namely, the second up/down counter 109 begins down counting from a predetermined value (an initial value is "80") when the first count value underflows, stops down counting when the first count value becomes the offset value ("80"), maintains the value at which the counting stopped, and performs down counting or up counting from the maintained value when the first count value underflows or overflows again.

When an overflow occurs, in which the first count value becomes "FF", the first up/down counter 106 performs down counting to a predetermined value (an initial value is "80"). At the same time, the second up/down counter 109 begins up counting from the offset value ("80"), and continues up counting until the first count value becomes the offset value ("80"). Once the first count value becomes the offset value ("80"), the second up/down counter 109 maintains its value, until the overflow or underflow occurs again.

The second digital-to-analog converter 110 converts the output of the second up/down counter 109 into an analog signal. The adder 111 adds the output of the first digital-to-analog converter 107 to that of the second digital-to-analog converter 110. The current amplifier 112 converts the sum voltage into a current signal to drive the laser diode 101. While the second up/down counter 109 operates due to the first up/down counter 106 overflowing or underflowing, the output of the adder 111 always has a uniform voltage. The laser diode 101 is driven by the uniform control voltage. At this time, the first up/down counter 106 performs up counting or down counting until the first count value becomes the offset value ("80").

FIGS. 3A through 3C will be explained in relation to FIGS. 4A through 4C to aid in the explanation of the operation of the temperature compensation apparatus of the present invention.

FIGS. 3A through 3C describe the operation of the first and second up/down counters 106 and 109 and a control voltage applied to the current amplifier 112 for driving the laser diode 101, when the luminous efficiency of the laser diode 101 rises.

As shown in FIG. 3A, when the first up/down counter 106 underflows ("00"), namely, the temperature of the laser diode 101 falls and the luminous efficiency rises, the second up/down counter 109 performs down counting from the offset value ("80") as "7F, 7E, 7D, . . ." as shown in FIG. 3B. At the same time, the first up/down counter 106 performs up counting as "01, 02, 03, . . ." as shown in FIG. 3A. When the count value of the first up/down counter 106 reaches "80," the second up/down counter 109 stops down counting. Only the first up/down counter 106 continuously operates for stabilizing the luminous efficiency of the laser diode 101.

When the first up/down counter 106 underflows, the output of the first up/down counter 106 is added to that of the second up/down counter 109 by the adder 111, to obtain a uniform corrected control voltage shown in FIG. 3C, which is applied to the current amplifier 112.

FIGS. 4A through 4C describe the operation of the first and second up/down counters 106 and 109 and the control voltage applied to the current amplifier 112 for driving the laser diode 101, when the luminous efficiency of the laser diode 101 falls.

When the first up/down counter 106 overflows ("FF"), namely, when the temperature of the laser diode 101 rises and the luminous efficiency falls, the second up/down counter 109 performs up counting as "81, 82, 83, . . ." from the offset value ("80") as shown in FIG. 4B. At the same time, the first up/down counter 106 performs down counting as "FE, FD, FC, . . ." as shown in FIG. 4A. When the count value of the first up/down counter 106 reaches "80", the second up/down counter 106 stops up counting. Only the first up/down counter 106 continuously operates for stabilizing the luminous efficiency of the laser diode 101.

When the first up/down counter 106 overflows, the output of the first up/down counter 106 is added to that of the second up/down counter 109 by the adder 111, to obtain a uniform corrected control voltage shown in FIG. 4C, which is applied to the current amplifier 112.

Therefore, in the present invention, the range of the control voltage is extended and the control error is reduced, due to the addition of the second up/down counter 109, the detector 108, and the second digital-to-analog converter 110.

The present invention can be constructed using various bit resolutions. However, an eight bit structure is preferable, considering manufacturing costs.

According to the present invention, it is possible to generate a control voltage based sufficiently on the luminous efficiency of a laser diode, thus providing a stabilized luminous efficiency and lower control error of the laser diode.

What is claimed is:

1. A temperature compensation apparatus of a laser diode, for controlling an output power of the laser diode by changing a control voltage according to a temperature variation of the laser diode, comprising:

a comparator to compare a voltage corresponding to the output power of the laser diode with a reference voltage, to generate an error voltage;

a first counter to count a first count value responsive to the error voltage, to generate a corrected error voltage, and to perform up and down counting of the first count value to change the corrected error voltage in response to a detection signal;

a detector to detect whether the first count value overflows or underflows, and to generate the detection signal in response to the first count value overflowing or underflowing;

a second counter to perform down and up counting of a second count value in response to the detection signal, in a reverse order to that of the first counter; and a control voltage generator to generate the control voltage based upon the corrected error voltage, and to add the first count value to the second count value when the first count value overflows or underflows to generate the control voltage as a uniform value.

2. The apparatus of claim 1, wherein the first counter performs up counting of the first count value to a predetermined offset value when the first count value underflows, and performs down counting of the first count value to the offset value when the first count value overflows, in response to the detection signal.

3. The apparatus of claim 2, wherein the second counter performs down counting of the second count value from a first value until the first count value becomes the offset value, and then maintains the down counted second count value as a third value, when the first count value underflows, and performs up counting from a second value until the first count value becomes the offset value, and then maintains the up counted second count value as a fourth value, when the first count value overflows.

4. The apparatus of claim 3, wherein the initial value of the first value and the second value are equal to the offset value.

5. A temperature compensation apparatus of a laser diode, comprising:

a voltage comparator to compare a voltage corresponding to an output power of the laser diode with a reference voltage, and to generate an error voltage;

a first up/down counter to count a first count value responsive to the error voltage, the first count value representing a variation in temperature of the laser diode, and to generate a corrected error voltage;

a detector to detect when the first count value overflows or underflows, and to generate a detection signal;

a second up/down counter to perform up and down counting of a second count value according to the detection signal, in a reverse order to that of the first up/down counter; and an adder to generate a control voltage based on the corrected error voltage, and to add the first count value to the second count value when the first count value overflows or underflows, which represents the variation in the temperature of the laser, to generate the control voltage responsive to the temperature variation as a uniform value; and a current converter to convert the control voltage into a current signal, and to apply the current signal to the laser diode.

6. The apparatus of claim 5, wherein the first up/down counter performs up counting of the first count value to a predetermined offset value when the first count value underflows, and performs down counting of the first count value to the offset value when the first count value overflows.

7. The apparatus of claim 6, wherein the second up/down counter performs down counting of the second count value from a first value until the first count value becomes the offset value, and then maintains the down counted second count value as a third value according to the detection signal, when the first count value underflows, and performs up counting of the second count value from a second value until the first count value becomes the offset value, and then maintains the up counted second count value as a fourth value, when the first count value overflows.

8. The apparatus of claim 7, wherein the initial value of the first value and the second value are equal to the offset value.

* * * * *